(12) United States Patent
Temchenko

(10) Patent No.: US 9,987,907 B1
(45) Date of Patent: Jun. 5, 2018

(54) HEAT SHAPEABLE FILM COMPOSITE

(71) Applicant: Madico, Inc., Woburn, MA (US)

(72) Inventor: Marina Temchenko, Salem, MA (US)

(73) Assignee: MADICO, INC., Woburn, MA (US)

( * ) Notice: Subject to any disclaimer, the term of this patent is extended or adjusted under 35 U.S.C. 154(b) by 47 days.

(21) Appl. No.: 15/191,139

(22) Filed: Jun. 23, 2016

Related U.S. Application Data

(60) Provisional application No. 62/183,493, filed on Jun. 23, 2015.

(51) Int. Cl.
| | |
|---|---|
| *B32B 27/40* | (2006.01) |
| *C09D 175/04* | (2006.01) |
| *B60J 3/00* | (2006.01) |
| *C09J 7/02* | (2006.01) |
| *B32B 27/36* | (2006.01) |
| *B32B 7/12* | (2006.01) |

(52) U.S. Cl.
CPC ............... *B60J 3/007* (2013.01); *B32B 7/12* (2013.01); *B32B 27/36* (2013.01); *B32B 27/40* (2013.01); *C09J 7/0285* (2013.01); *B32B 2605/006* (2013.01); *C09J 2400/16* (2013.01); *C09J 2467/00* (2013.01); *C09J 2475/00* (2013.01)

(58) Field of Classification Search
CPC C09D 175/04; C08K 5/005; B32B 2307/738; B32B 27/40; Y10T 428/31565
USPC ....................................... 428/423.7; 106/494
See application file for complete search history.

(56) References Cited

U.S. PATENT DOCUMENTS

| | | | |
|---|---|---|---|
| 5,338,318 A | 8/1994 | Mercado | |
| 6,465,565 B1 * | 10/2002 | Garcia ............... | C08G 18/0823 428/423.1 |
| 2003/0054175 A1 * | 3/2003 | Okajima ............ | C08G 18/0823 428/423.7 |
| 2003/0203141 A1 * | 10/2003 | Blum ...................... | B32B 27/08 428/35.7 |
| 2007/0026223 A1 * | 2/2007 | Osada ..................... | B32B 27/08 428/332 |
| 2015/0104698 A1 * | 4/2015 | Fung ................... | H01M 2/0285 429/175 |
| 2016/0145458 A1 * | 5/2016 | Walker, Jr. ........... | C09D 127/12 428/325 |

OTHER PUBLICATIONS

Barry Jones, "Fluoropolymers for Coating Applications", Halocarbon Products Corporation, JCT Coatings Tech Magazine, vol. 5, No. 9, Sep. 2008, 10 pages.

* cited by examiner

*Primary Examiner* — Thao T Tran
(74) *Attorney, Agent, or Firm* — Michael E. Dockins; Shumaker, Loop & Kendrick, LLP

(57) ABSTRACT

Composite film structures including a polyfluorourethane (PFU) layer are described. The PFU layer is in contact with a polymer film to form a thermoformable composite film. The composite films exhibit a low Tg and resulting shapeability allowing them to be applied to non-planar irregular surfaces. The composite achieves thermoformability in the absence of deep dip dyeing.

20 Claims, 3 Drawing Sheets

HEAT SHAPEABLE FILM COMPOSITE

CROSS-REFERENCE TO RELATED APPLICATIONS

This application claims benefit of U.S. Provisional Application No. 62/183,493, the contents of which are incorporated by reference herein.

TECHNICAL FIELD

The invention relates to transparent films and, in particular, to transparent film composites that are heat shapeable.

BACKGROUND

Polymer films can be used to protect and improve the aesthetics of transparent materials such as automotive windows. The films can include a pressure sensitive adhesive (PSA) to aid in attachment to the windows and windshield. These films can include dyes that provide color and tinting as well as reduce solar radiation transmission.

SUMMARY OF THE INVENTION

In one aspect, a heat shapeable transparent composite film is provided, the composite film comprising at least one polyester film and a polyurethane layer adhered to the polyester film, the polyurethane layer including fluorourethane groups. The polyurethane layer can be an adhesive and can include a plasticizer. When heated to greater than 140° C. the composite film expands at least 0.5% in the transverse direction and does not expand in the machine direction. The polymer film can be void of glycerol, glycols and ester solvents. The composite can include at least one of cross-linking agents, NIR dyes, UV absorbers, light stabilizers, antioxidants, light reflectors, metal coatings, metal oxide coatings, and combinations thereof. The composite may also include a metal coating wherein the metal coating comprises gold, silver, aluminum or nickel. The polyurethane layer of the composite can include a dye blend, pigments blend, UV absorber, light stabilizer and antioxidants wherein the dye blend is 10 to 40 parts by weight, pigments blend is 2-30 parts by weight, and the UV absorber, light stabilizer and antioxidants are 1 to 20 parts by weight. The composite may be affixed to an automobile window and may include a pressure sensitive adhesive as well as a release layer.

In another aspect, a composite is provided, the composite comprising an irregular or compound substrate, a layer of polyester film in conformance with the substrate, a layer comprising polyurethane including fluorourethane groups, the polyurethane adhered to the polyester film and in conformance with the substrate, and a pressure sensitive adhesive adhering the polyester film to the irregular or compound substrate. The irregular or compound substrate can be a non-planar window or a vehicle body. The layer comprising polyurethane may be void of plasticizer or may include a plasticizer. The polyester film is not deep dip dyed and/or is free of added plasticizer and free of dye carrier. When applied to the substrate, the polyester film layer is conformed to the irregular or compound substrate by applying heat.

In another aspect, a method of making a heat shapeable composite film is provided, the method comprising coating a non-heat shapeable polymer film substrate with a fluorourethane oligomer and cross-linking the fluorourethane oligomer to form a polyfluorourethane layer adhered to the polymer substrate. The method can include adhering a second polymer film to the polyfluorourethane layer.

In another aspect, a method of thermoforming a film composite to a glass substrate is provided, the method comprising coating a polyester substrate with a mixture including a fluorinated polyol, polymerizing the mixture to form a film composite including a polyfluorourethane layer on the polyester substrate, applying the film composite to a glass substrate, and heating the film composite to expand the composite in the transverse direction and contract the composite in the machine direction.

In another aspect, a method of thermoforming a film composite to a substrate is provided, the method comprising applying heat to a film composite comprising a polymer film substrate and a fluorourethane coating bonded to the polymer film substrate, expanding the composite in the transverse direction, and contracting the composite in the machine direction. The polymer film substrate can be a semicrystalline polymer.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
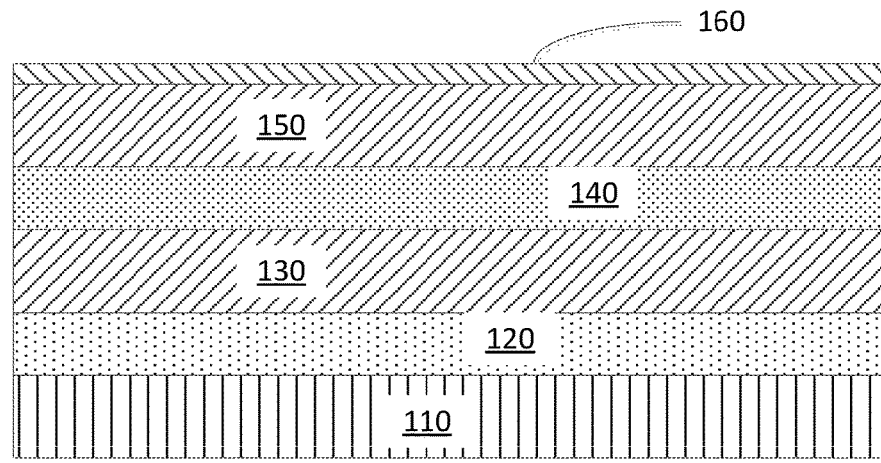
FIG. 1 is a cross-sectional view of one embodiment of a flexible film composite.
Figure 1:
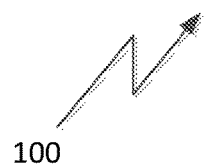

Deep dip dyed films are widely used for automotive window film applications because of their excellent heat shapeability. Heat shapeability allows a film to conform to an irregular or compound surface upon heating while retaining optical clarity. As used herein, an irregular surface is a surface that is non-planar and has an aspect ratio of greater than 5%. The aspect ratio of an irregular surface is the ratio of the distance of greatest variation from an imaginary plane on which the surface rests to the average diameter of the surface. A compound surface is a surface that includes different curvatures such that the curvature of the surface cannot be defined by a single parametric equation. Heat shapeable films can be thermoformable films. Heat can be applied to the films using, for example, hot air or infrared lamps. The films can be dyed to help, for example, in the reduction of light transmission or to provide a specific tint to the film. The process of dyeing these polyethylene terephthalate films is expensive, time consuming and requires special equipment. In some of these cases, the film is immersed in a preheated bath containing a solvent based dispersion of dye and liquid carrier. After immersion, the film is washed and heated to carefully remove excess solvent and carrier without degrading/removing the dye. In some cases, a polyol or glycol is used as a carrier for the dye and it has been found that an ultrasonic bath can improve dye absorption. A PET film can be pretreated with a dye carrier such as phenol, ortho- and paraphenylphenol, diphenyl, chlorinated benzenes and diphenyls, methyl salicylate, benzoic acid and benzyl alcohol. Other examples include simple solvents such as the chlorinated hydrocarbons, for example methylene chloride, tetrachloroethane, chloroform or trichloroethylene. The dye-carrier is a material which has a noticeable swelling action on the film and consequently accelerates dyeing so that, for example, dyeing can satisfactorily be carried out at a temperature in the range of 80-100° C. with a dyeing time of about 1-3 hours. Deep dip dyed films contain high dye concentrations and may contain significant or residual amounts of the enabling solvent, for example, solvents including hydroxyl groups or esters. Deep dip dyed film processing techniques are described in U.S. Pat. No. 5,338,318 which is incorporated by reference herein.

The composite films described herein can provide similar or better thermoformability characteristics while being faster to manufacture than conventional deep dip dyed films. The polymer film layers (e.g., polyester films) in the film composites described herein are not deep dip dyed and therefor need not include the materials such as dyes, dye carriers and solvents that are present in the deep dip dyed materials. Thermoformability is the ability of a material to conform and remain conformed to an irregular or compound surface or substrate. The film composites described herein can include a flexible layer that is coated on to a polymer substrate to provide thermoformability to the substrate. The flexible layer can be a layer comprising a fluoropolymer or a polyurethane with a fluorinated group. In some cases, the fluoropolymer is a polyurethane that includes fluorine atoms or fluorocarbon groups. The fluoropolymer can be a polyurethane such as a polyfluorourethane (PFU). The layer may include additives such as, for example, a radiation absorber or reflector, a plasticizer, a pigment, an antioxidant, one or more dyes or a UV inhibitor. The polyurethane layer is a distinct layer that is bonded to the underlying polymer film. The layer can be, for example, an outer layer on a polymer substrate or it can be an adhesive joining two films together to form a composite film. As used herein, a "composite film" is a composition that includes at least one polymer film and a distinct second layer that is adhered to the polymer film but is distinct from the polymer film. The layer may include a plasticizer. Plasticizers are known to those skilled in the art and can penetrate in between the molecules of polymer and serve as a lubricant for polymeric molecules, thus making the polymeric film more workable, soft, and flexible. One way of measuring the effect of a plasticizer is the reduction of glass transition temperature (Tg) of the polymer. Many of the plasticizers that can be used with the films described herein are based on esters and glycols and can be polyesters or polyglycols. Examples of plasticizers include triglycerides such as 1,2,3-triacetoxypropane (triacetin), available from Sigma-Aldrich, 2-Ethylhexyl diphenyl phosphate (Disflamoll® DPO) from Lanxess, phthalic polyesters such as ULTRAMOLL® TGN from Lanxess, adipic polyesters such as ULTRAMOLL® M from Lanxess, ethylene glycol from Sigma-Aldrich and glycerol from Sigma-Aldrich. In some of the embodiments described herein, the heat shapeability of the film is improved by forming the composite without the addition of a plasticizer.

It has been found that by coating a flexible coating or adhesive onto an extruded polymer substrate, the heat shapeability of the polymer substrate can be altered in a manner that mimics or improves on that of deep dip dyed films. The polymer substrate may be a semicrystalline polymer. The flexible coating may or may not include plasticizers. The thermoformability characteristics of a deep dip dyed film can be incorporated into the polymer substrate without chemically treating the polymer substrate. It is believed that the intermolecular forces between the coating and the substrate allow the coating to directly alter the thermoformability of the substrate and the composite film. The flexible coating (including adhesives) includes long molecular weight polymers that may incorporate elastic elements to the composite through co-polymerization or cross-linking. Thus, similar thermoformable properties can be achieved without treating the substrate with solvents or plasticizers as is done with the deep dip dyed process.

One or more embodiments of the present invention relates to using polyurethanes, including polyfluorourethanes, as a coating composition or adhesive composition. The polyurethanes described herein can be produced by reacting of variety of polyols and isocyanates. For example, a fluorinated diol or polyol can be reacted with a conventional isocyanate or a fluorinated isocyanate can be reacted with a conventional diol or polyol. Polyols include, but are not limited to, polyester polyols, polyether polyols, polycarbonate polyols, fluorinated polyols, phosphorous containing polyols, and their mixtures. One group of the embodiments described herein is directed to using fluorinated polyurethane as a laminating adhesive. The same or similar fluorinated polyurethanes can be used as a coating on a transparent film substrate. Fluorinated polyols to make polyfluorourethane adhesives may be obtained from Daikin as Zeffle® or from Asahi Glass as Lumiflon®. A variety of isocyanates can be used to crosslink the polyols and form the urethane polymer. Appropriate isocyanates may be, for example, polyisocyanates and diisocyantes such as methylene diphenyl diisocyanate (MDI), toluene diisocyanate (TDI), hexamethylene diisocyanate (HDI) and isophorone diisocyanate (IPDI). One example of an HDI based polyisocyanate found to work well in many embodiments is Desmodur® N-3800 from Bayer.

Organic solvents useful in the formation of coatings and adhesives described herein include both protic and aprotic solvents. Classes of appropriate solvents include one or more of ketones, ethers, esters, aldehydes, alcohols, aliphatic hydrocarbons and aromatic hydrocarbons. Specific examples include methyl ethyl ketone (MEK), acetone, methyl isobutyl ketone (MIBK), toluene, xylene, methanol, isopropanol, tetrahydrofuran, ethanol, heptane, ethyl acetate, isopropyl acetate, n-butyl acetate, n-butyl alcohol, dimethyl acetamide, N-methyl-2-pyrrolidon, benzene, 1-butanol, 2-butanol, 2-butanone, diethylene glycol, diethyl ether, cyclohexane, 1,2-dichloroethane, 1,4-dioxane, methanol, pentane, or mixtures thereof.

The polymer film onto which the polyurethane layer is contacted to form a composite can be, for example, a polyester such as polyethylene terephthalate (PET), polypropylene, polyethylene, polyethylene vinyl acetate, polycarbonates, cellulose and cellulose derivatives, polyurethanes, polyacrylates, polymethacrylates, polythiophenes, poly(3,4-ethylenedioxythiophene)/polystyrene sulfonate, polystyrene, biopolymers, fluoropolymers, chlorofluoropolymers, vinylfluoropolymers, poly (vinyl chloride), polyethers, polyimides, polyetherimides and combinations thereof.

A variety of dyes and pigments may be used to provide color tint to the film or to provide for filtration or reflection of specific wavelength ranges of light. In certain embodiments, the composite film structures may include one or more conventional solar control elements. Thus, the films may include various types of coatings, layers and compositions which affect the transmission and/or reflection of light through the film structure. In some embodiments the coatings and layers can have little or no effect on the transmission of visible light. Accordingly, the films may include elements which block or reflect at least a portion of the incident visible, infrared, or ultraviolet light. As used herein, infrared light is light having a wavelength in the range of 700 to 5000 nm and near infrared is in the range of 700 to 1400 nm. In some cases, the films may contain light absorbers, e.g., NIR dyes and UV absorbers, light stabilizers, antioxidants, light reflectors, metal coating and/or metal oxide coating on the polymeric film or a combination of light absorbers, light reflectors and/metal/metal oxide coating. Useful metals for optically active coatings on polymeric films include gold, silver, aluminum, nickel, copper, and metal oxides such as indium oxide, tin oxide and the like. Metal and oxide coatings can have a coating thickness in the range of about 10 to about 100 nanometers. Metallized films useful in the present invention may be made by depositing metal onto a polymer surface by, for example, physical vapor deposition or by sputtering. Pigments may also be added to the composite films. For example, a polyfluorourethane layer can include pigments such as carbon black, metal oxides, graphene, carbon nanotubes and metals. Any of these components can be included in any one or more layers of optically clear film composites. A film composite is defined as optically clear if it exhibits a haze value less than 5% using ASTM D1003.

In some embodiments, the polyurethane (e.g., polyfluorourethane) layer may be void of additives. For example, the urethane layer may be void of one or more of plasticizers, pigments, dyes, solar control agents, adhesives and UV inhibitors.

The composite film structures described herein can include extruded films, co-extruded films, coated layers, adhesion promoters, laminated layers and adhesives. Layers may be co-extruded, adhered using an adhesive or adhered using heat lamination. The compositions of various embodiments can be applied to polymeric film by any of a variety of methods known to those skilled in the art of film coating. Methods include Meyer rod coating, comma coating, gravure coating, spraying, slot die coating, curtain coating, dipping or brushing. The coating techniques can result in a polyurethane layer that is directly bonded to underlying polymer substrate, for example, a polyester film. In many embodiments, no adhesive or adhesion promotor is required to provide a permanent bond.

In many embodiments, the composite films are able to expand in one direction and contract in the other when heat is applied. The machine direction of a film or film composite is the direction in which the web moves as the coating is applied. The transverse direction is across the web, 90 degrees to the machine direction. In many embodiments, the composite film, upon heating, expands in the transverse direction and contracts in the machine direction. The film composites described herein can exhibit transverse expansion upon heating (without any tensile force) of greater than 0.1%, greater than 0.2%, greater than 0.5% or greater than 1.0%. Concurrent contraction in the machine direction can be greater than 0.1%, greater than 0.2% or greater than 0.3%. Temperatures to promote thermoformability and/or contraction can be, for example, greater than 50° C., greater than 100° C., greater than 150° C., greater than 200° C. or greater than 250° C. In many embodiments, the thermoformability expansion and/or contraction is irreversible. The time required to promote thermoformability can be less than 3 minutes, less than one minute or less than 30 seconds.

FIG. 1 illustrates one embodiment of a composite film including an adhesive that comprises a polyfluorourethane. The embodiment of FIG. 1 includes a first transparent polymeric film 130 and a second transparent polymeric film 150. Films 130 and 150 may be the same or different and can be, for example, polyester films such as PET. Films 130 and 150 can be adhered together using fluorinated polymeric adhesive 140. Adhesive 140 can optionally include a dye and can also include a plasticizer. As illustrated, scratch resistant coating 160 has been coated onto the outer surface of film 150. The scratch resistant coating can be, for example, a UV cured acrylate polymer. Pressure sensitive adhesive (PSA) layer 120 is coated onto the surface of film 130 that opposes the surface in contact with adhesive 140. Pressure sensitive adhesive layer 120 optionally includes a plasticizer that may be the same as or different than a plasticizer that may be used in the adhesive layer 140. Pressure sensitive adhesive layer 120 can also optionally include a dye. Release liner 110 can be applied to the PSA to protect the film composite and to help in installing the film on, for example, an automobile window.

Figure 2:
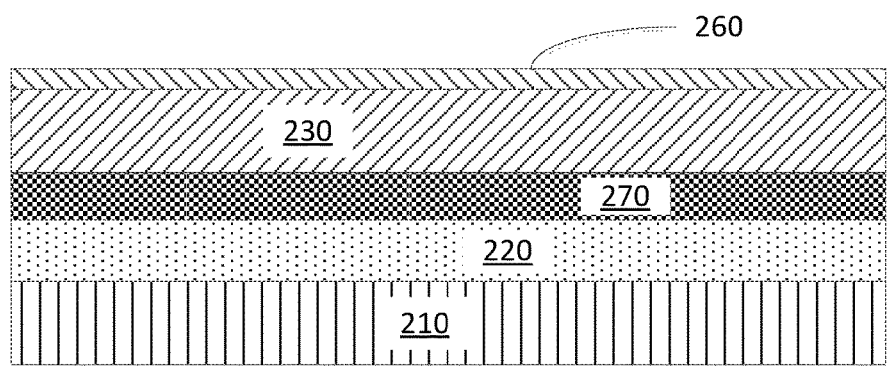
FIG. 2 is a cross-sectional view of a second embodiment of a flexible film composite.
Figure 2:
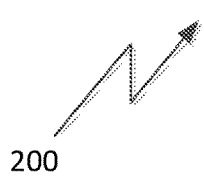

A cross sectional view of another embodiment is provided in FIG. 2. Composite film 200 includes transparent polymer film 230 that has been coated with polyfluorourethane (PFU) coating 270. PFU coating 270 can include a plasticizer as well as a dye and a solar control agent. The opposing surface of film 230 can be coated with scratch resistant layer 260. Pressure sensitive adhesive layer 220 can be in direct contact with PFU coating 270 and can include a release liner on the side opposed to the PFU coating 270. The PSA 220 can also include a plasticizer and a dye. Such PFU compositions can be prepared by mixing 50 to 200 parts by weight of plasticizer with a fluorinated polyol adhesive base and 10 to 40 parts by weight of dye blend, 2 to 20 parts by weight of UV absorber, 2 to 20 parts by weight of light stabilizer, 2 to 20 parts by weight of antioxidant and 5 to 40 parts by weight of organic solvent such as MEK.

Other embodiments include two, three or four layers of polymer substrate with polyfluorourethane dispersed there between. The polyfluorourethane layers can be on the outside, the inside or in between other layers in the composite. Polymeric films may be in contact with a polyfluorourethane layer on one, both or neither surface of the film. Film, coating, adhesive and polyfluorourethane layers may have thicknesses of greater than 1 µm, greater than 5 µm, greater than 10 µm, greater than 15 µm, greater than 25 µm, greater than 50 µm, less than 100 µm, less than 50 µm, less than 20 µm, or less than 10 µm.

Example 1

Example 1 provides a transparent film composite that includes an adhesive layer comprising a fluorinated urethane. The adhesive composition was prepared by mixing the following together in the amounts provided in Table 1: a plasticizer; a fluorinated polyol base, a dye blend, UV absorber, light stabilizer and antioxidant in an organic solvent. The formulation of the laminating adhesive is as follows.

TABLE 1

| Component | Amount (g) |
| --- | --- |
| Zeffle ® GK 570 (Daikin) | 100 |
| Dye blend | 1.3 |
| Tinuvin ® 384-2 (BASF) | 4.4 |
| Triacetin (Sigma Aldrich) | 30 |
| Desmodur ® N 3800 (Bayer) | 13 |
| Tinuvin ® 123 (BASF) | 1.31 |
| Tinuvin ® 152 (BASF) | 1.35 |

TABLE 1-continued

| Component | Amount (g) |
|---|---|
| Cyanox ® 2777 (Cytec) | 0.3 |
| MEK | 70 |
| Dioctyltin dilaurate (11.5%) | 0.3 |

A pressure sensitive adhesive (PSA) was made by mixing the following components in the amounts specified in Table 2.

TABLE 2

| PSA Component | Amount (g) |
|---|---|
| Oribain BPS P-162 (Liochem) | 325 |
| BXX-4805 (Liochem) | 3.2 |

A dye blend selected to provide color tint to the film composite was made by mixing the following materials in the amounts specified in Table 3.

TABLE 3

| Dye component | Dye Amounts (g) |
|---|---|
| Savinyl Black RLSN (Clariant) | 0.83 |
| Savinyl Yellow RLSN (Clariant) | 0.22 |
| Savinyl Fire Red 3GLS (Clariant) | 0.028 |
| Orasol Brown 326 (BASF) | 0.17 |

Film composite samples were prepared as follows:

A solution of the fluorinated polyol base adhesive base (Zeffle) was mixed with the plasticizer (triacetin) followed by the addition of dye blend, UV absorber (Tinuvin® 384-2), light stabilizer (Tinuvin 152 and 123), antioxidant (Cyanox 2777), crosslinking agent (Desmodur® N 3800) and catalyst (dioctyltin dilaurate). The components were mixed using a disperser for 30 minutes at ambient temperature. The formulation was applied to a 12.5 micron thick polyester film (PET) at a coating weight of 15 g/m² and laminated with the second polyester film. A scratch resistant UV curable coating was applied to the exterior surface of one side of the laminate. Pressure sensitive adhesive was applied on the opposite side of laminate at a coating weight of 5 g/m² and was laminated to a release liner.

Figure 3:
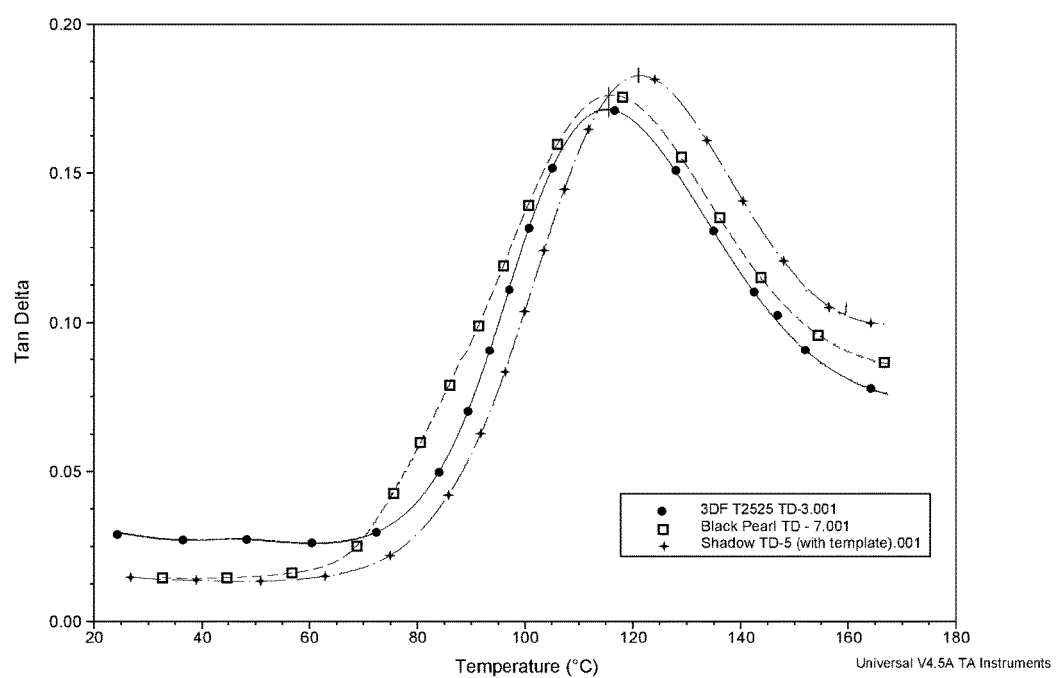
FIG. 3 is a graph showing the glass transition temperature of various films.

Experimental and control samples were prepared and were subjected to dynamic mechanical analysis, thermal mechanical analysis and in field testing. As is seen in the DMA graph in FIG. 3, the glass transition temperature, Tg, of a non-plasticized composite film Shadow™ (PET) was 121° C., and the Tg of the composite containing the deep dip dyed film Black Pearl™ (PET) was 116° C., while the Tg of experimental composite comprising a 15 g/m² PFU coating on 12.5 μm PET (T2525) was 115° C. This result indicates a reduction in Tg and an improvement in shapeability with the addition of a fluoropolymer adhesive layer to the polymer film. Conventional film composites require 1 to 3 hours of heat treatment in order to arrive at similar glass transition temperatures. In contrast, the experimental composite was subjected to an elevated temperature of about 115° C. for less than 1 minute. It is notable that the Tg of the composite has actually been reduced by coating the underlying substrate with the adhesive mixture, so that the composite actually has a lower Tg than does the film component of the composite (PET film) by itself. This is achieved without any chemical treatment of the PET film.

Example 2

This example illustrates the preparation of polyfluorourethane based coating composition on a transparent film composite. The solutions were prepared by mixing a fluorinated polyol base, isocyanate, appropriate dye blend, UV absorber, light stabilizer and antioxidant in an organic solvent in the same proportions as Example 1. No plasticizer was added. The dye blend used in this example is provided in Table 4.

TABLE 4

| Dye component | Dye Amounts (g) |
|---|---|
| Orasol Black RLI (Ciba Geigy) | 15.6 |
| Orasol Orange G (Ciba Geigy) | 2.3 |
| Macrolex Violet 3R (Ciba Geigy) | 1.1 |

Samples were prepared according to the following procedure:

A solution of the fluorinated polyol base was mixed with dye blend (Table 4), UV absorber, light stabilizer, antioxidant, crosslinking agent and catalyst. No plasticizer was used. This formulation was applied on 25 micron thick polyester film (PET available from Toray) at a coating weight of 15 g/m². Pressure sensitive adhesive was applied on the release liner at a coating weight of 5 g/m² and laminated with the fluoropolyurethane coating. A scratch resistant UV curable coating was applied on the opposing side of the laminate. These samples were subjected to thermal mechanical analysis (TMA) and in field installation.

Figure 4:
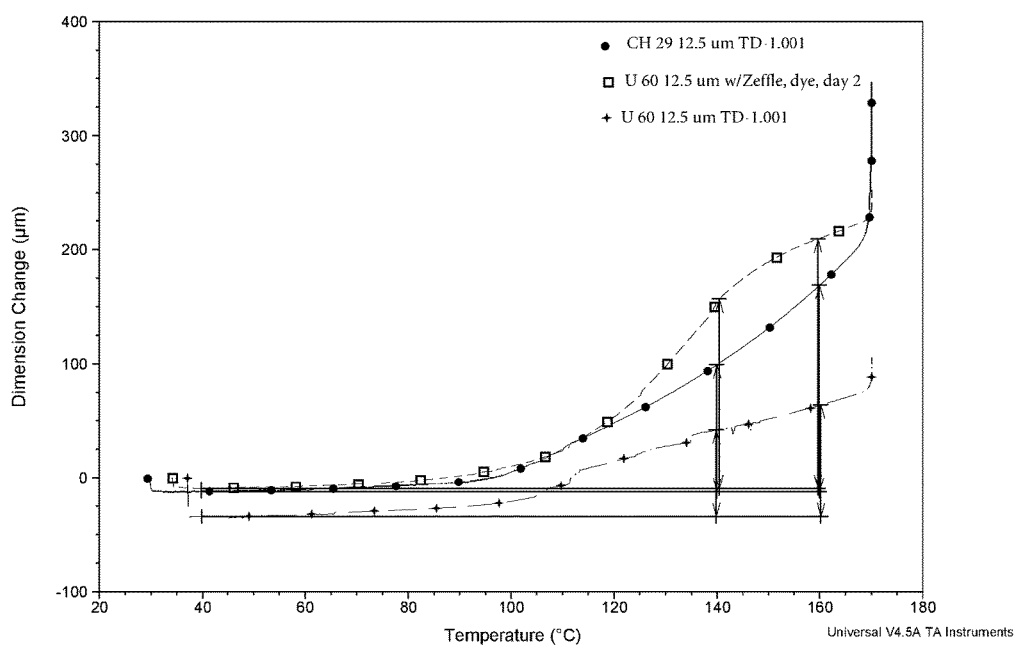
FIG. 4 is a graph showing the dimensional change upon heating of three different films.

Deep dip dyed films exhibit good shapeability due to their ability to shrink in the machine direction and expand in the transverse direction. The greater expansion a film exhibits in the transverse direction, the better the film's shapeability. Dimensional changes in the transverse axis for three different films are provided in Table 5 and in the TMA graph provided in FIG. 4. Each PET film has a thickness of 25.4 μm. Sample CH 29 is a deep dip dyed film available from Eastman. Sample PET U 60 is untreated PET film, available from Toray. Sample PET U 60+PFU is the PET U 60 film plus a coating of PFU (Zeffle) at a coating weight of 15 g/m². As evident from the results, 25.4 μm regular PET U 60 coated with Zeffle® based polyfluorourethane coating film expands in the transverse direction better than the uncoated PET U 60 and as good or better than the 25.4 μm deep dip dyed film CH 29 film. Note that there is no plasticizer in the PFU based coating.

TABLE 5

| Film ID | % change at 140° C. | % change at 160° C. |
|---|---|---|
| CH 29 | 0.696 | 1.126 |
| PET U 60 + PFU | 1.037 | 1.365 |
| PET U 60 | 0.471 | 0.607 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A heat shapeable transparent composite film comprising:
    at least one polyester film, and
    a polyurethane layer applied to the polyester film, the polyurethane layer including fluorourethane groups;
    wherein the composite film is heat shapeable and expands in a transverse direction and contracts in a machine direction upon heating at 140° C. the polyurethane layer further comprising 10 to 40 parts by weight of the dye blend and/or 2 to 30 parts by weight of the pigment blend and/or 1-20 parts by weight of a mixture of a UV absorber, a light stabilizer, and antioxidants.

2. The composite film of claim 1 wherein the polyurethane layer is an adhesive layer.

3. The composite film of claim 1 wherein the polyurethane layer further comprises a plasticizer.

4. The composite film of claim 3 wherein the heat shapeable transparent composite film has a lower glass transition temperature than the at least one polyester film.

5. The composite film of claim 1 wherein the composite film expands at least 0.5% in the transverse direction upon heating to a temperature of 140° C.

6. The composite film of claim 1 wherein the polyester film is an extruded or co-extruded film that is void of glycerol, glycols and ester solvents.

7. The composite film of claim 1, further comprising at least one of cross-linking agents, near infrared dyes, UV absorbers, light stabilizers, antioxidants, light reflectors, metal coatings, metal oxide coatings, and combinations thereof.

8. The composite film of claim 7 comprising a metal coating wherein the metal coating comprises silver, aluminum or nickel.

9. The composite film of claim 1, the polyurethane layer further the polyurethane layer comprising 10 to 40 parts by weight of the dye blend, 2 to 30 parts by weight of the pigment blend, and 1-20 parts by weight of a mixture of the UV absorber, the light stabilizer and the antioxidants.

10. The composite film of claim 1 wherein the polyurethane layer comprises at least one dye.

11. An automobile window comprising the transparent composite film of claim 1.

12. The composite film of claim 1 further comprising a pressure sensitive adhesive.

13. The composite film of claim 12 further comprising a release layer in contact with the pressure sensitive adhesive.

14. A composite comprising:
    an irregular or compound substrate;
    a layer of polyester film in conformance with the substrate;
    a layer comprising polyurethane including fluorourethane groups, the polyurethane adhered to the polyester film and in conformance with the substrate, wherein the layer of polyester film and the layer comprising polyurethane containing fluorourethane groups are heat shaped in conformance with the substrate resulting in expansion in a transverse direction and contraction in a machine direction; and
    a pressure sensitive adhesive adhering the polyester film to the irregular or compound substrate wherein the polyurethane layer further comprising 10-40 parts by weight of a dye blend and/or 2-30 parts by weight of a pigment blend and/or 1-20 parts by weight of a mixture of a UV absorber, a light stabilizer, and antioxidants.

15. The composite of claim 14 wherein the irregular or compound substrate is a non-planar window or a vehicle body.

16. The composite of claim 14 wherein the layer comprising polyurethane is void of plasticizer.

17. The composite of claim 14 wherein the layer comprising polyurethane comprises a plasticizer.

18. The composite of claim 14 wherein the polyester film has not been deep dip dyed and/or is free of added plasticizer and dye carrier.

19. The composite of claim 14 wherein the polyester film layer is conformed to the irregular or compound substrate by applying heat.

20. A method of thermoforming a film composite to a substrate, the method comprising:
    applying heat to a film composite comprising a polymer film substrate and a fluorourethane coating bonded to the polymer film substrate, wherein the film composite is heat shapeable and expands in a transverse direction and contracts in a machine direction upon heating at 140° C.;
    expanding the composite in the transverse direction; and
    contracting the composite in the machine direction wherein the polyurethane layer further comprising 10-40 parts by weight of a dye blend and/or 2-30 parts by weight of a pigment blend and/or 1-20 parts by weight of a mixture of a UV absorber, a light stabilizer, and antioxidants.

* * * * *